US012233788B2

(12) United States Patent
Honda et al.

(10) Patent No.: US 12,233,788 B2
(45) Date of Patent: Feb. 25, 2025

(54) CONTROL APPARATUS

(71) Applicant: SUBARU CORPORATION, Tokyo (JP)

(72) Inventors: Izumi Honda, Tokyo (JP); Takashi Moriyama, Tokyo (JP); Takashi Kobayashi, Tokyo (JP); Tomoya Takeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 303 days.

(21) Appl. No.: 18/055,933

(22) Filed: Nov. 16, 2022

(65) Prior Publication Data
US 2023/0166679 A1 Jun. 1, 2023

(30) Foreign Application Priority Data
Nov. 26, 2021 (JP) .................. 2021-191700

(51) Int. Cl.
B60R 16/023 (2006.01)
H01H 50/18 (2006.01)
H01H 50/54 (2006.01)

(52) U.S. Cl.
CPC ......... B60R 16/0231 (2013.01); H01H 50/18 (2013.01); H01H 50/54 (2013.01)

(58) Field of Classification Search
CPC .... B60R 16/0231; H01H 50/18; H01H 50/54; H01H 1/62; H01H 47/32; H01H 50/12; G05B 23/0221
See application file for complete search history.

(56) References Cited

U.S. PATENT DOCUMENTS

| 2014/0217194 | A1* | 8/2014 | Han | B60S 1/56 239/284.1 |
| 2018/0047535 | A1* | 2/2018 | Sugisawa | H02M 3/157 |
| 2018/0233311 | A1* | 8/2018 | Suzuki | H01H 47/002 |
| 2019/0360739 | A1* | 11/2019 | Brown | E01D 19/16 |
| 2020/0166574 | A1* | 5/2020 | Lee | G01R 19/16519 |
| 2021/0336473 | A1* | 10/2021 | Nishida | H02J 3/14 |
| 2021/0402938 | A1* | 12/2021 | Lee | B60R 16/0231 |
| 2022/0245980 | A1* | 8/2022 | Peng | G07C 9/00857 |

FOREIGN PATENT DOCUMENTS

JP 2011-210385 A 10/2011

* cited by examiner

Primary Examiner — Donald J Wallace
Assistant Examiner — Jalal C Coduroglu
(74) Attorney, Agent, or Firm — Rimon P.C.

(57) ABSTRACT

A control apparatus includes a processor that determines whether an ice generation condition is satisfied on the basis of at least one or both of a state of a heat source of a vehicle and an outside air temperature after an operation stop of a drive source of the vehicle. If the ice generation condition is satisfied, the processor repeats an ice-crushing operation at a predetermined time interval in a predetermine ice-crushing time period by turning on and thereafter turning off the relay. The predetermined ice-crushing time period is determined on the basis of a temperature difference between a temperature of the fixed contact or the movable contact of the relay and a temperature of an internal atmosphere inside the relay. The predetermined time interval is a time period in which the ice on the fixed contact and the movable contact of the relay grows to a predetermined size.

16 Claims, 6 Drawing Sheets

CONTROL APPARATUS

CROSS-REFERENCE TO RELATED APPLICATIONS

The present application claims priority from Japanese Patent Application No. 2021-191700 filed on Nov. 26, 2021, the entire contents of which are hereby incorporated by reference.

BACKGROUND

The disclosure relates to a control apparatus that is to be mounted on a vehicle and controls a relay.

Some vehicles are provided with a relay which electrically couples or decouples a power source to/from an electrical load. If the relay is turned off in a low temperature environment in accordance with a stop of an operation of a drive source of the vehicle, and if thereafter a predetermined condition is satisfied, freezing can occur at contacts of the relay in some cases. Once the freezing occurs, the contacts are electrically insulated from each other by ice generated by the freezing when the relay is turned on upon activation of a vehicle. This hinders appropriate electric power supply to the contacts. For example, Japanese Unexamined Patent Application Publication (JP-A) No. 2011-210385 discloses a technique that applies a PWM-modulated voltage to an exciting coil of a relay for a predetermined time period after an input of a signal to stop driving of a vehicle. In this technique, a PWM-modulated voltage is applied to an exciting coil at a duty ratio enough to maintain electric power supply to contacts of the relay. According to the technique, the contacts are continuously heated because electric power supply to the contacts of the relay is maintained. This suppresses occurrence of freezing at the contacts of the relay.

SUMMARY

An aspect of the disclosure provides a control apparatus to be mounted on a vehicle. The control apparatus includes one or more processors and one or more memories coupled to the one or more processors. The one or more processors is configured to control a relay that includes a fixed contact and a movable contact. The one or more processors are configured to determine whether an ice generation condition in which ice is expected to be generated on the fixed contact and the movable contact of the relay due to freezing is satisfied on the basis of at least one or both of a state of a heat source of the vehicle and an outside air temperature after a stop of an operation of a drive source of the vehicle, and intermittently repeat, in a case where the ice generation condition is satisfied, an ice-crushing operation at a predetermined time interval in a predetermined ice-crushing time period after a time point when the relay is turned off in accordance with the stop of the operation of the drive source, by turning on the relay having been turned off and thereafter turning off the relay to collide the movable contact against the fixed contact. The predetermined ice-crushing time period is determined on the basis of a temperature difference between a temperature of the fixed contact or the movable contact of the relay and a temperature of an internal atmosphere inside the relay. The predetermined time interval is a time period in which the ice on the fixed contact and the movable contact of the relay grows to a predetermined size.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
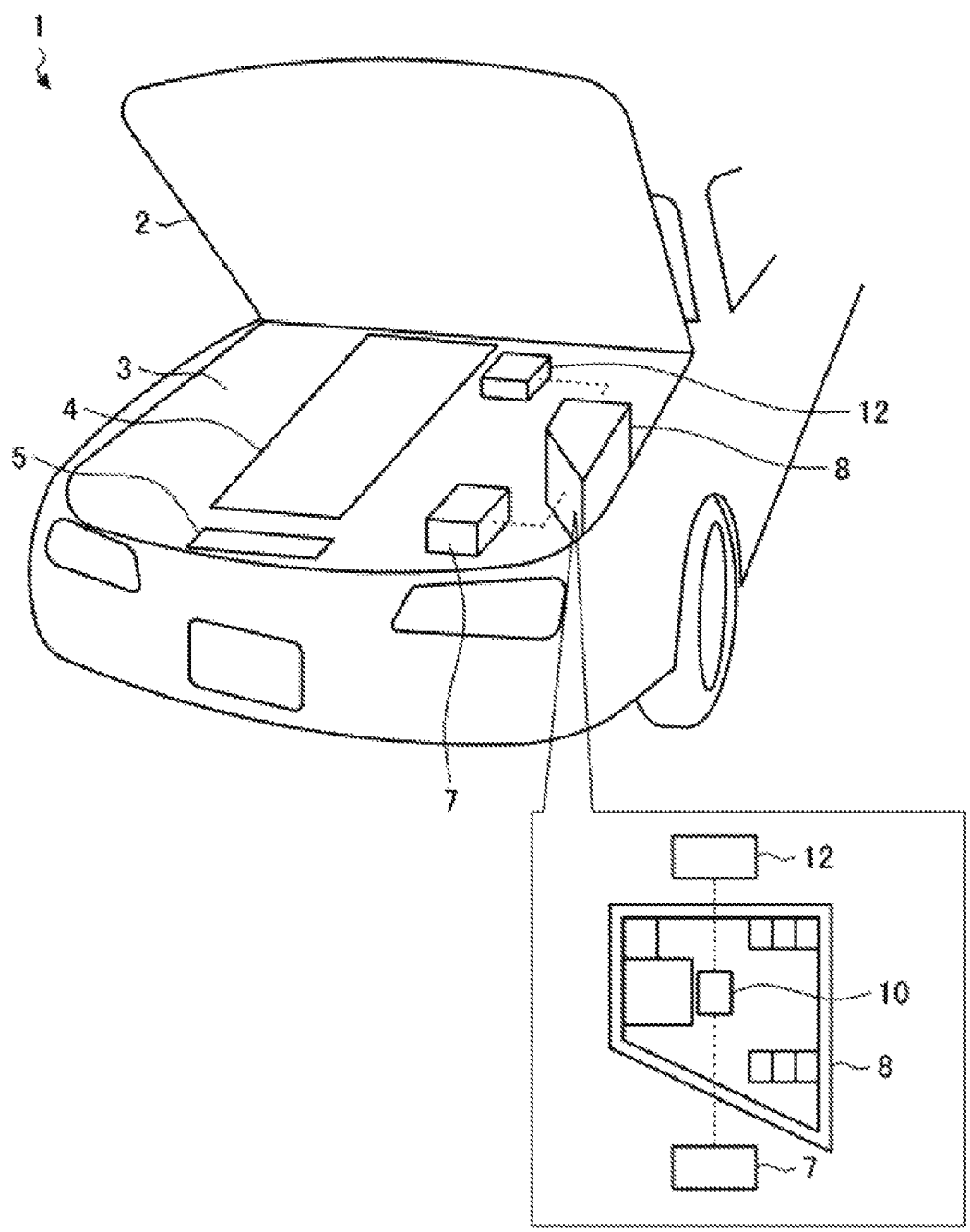
FIG. 1 is a schematic view of a vehicle including a relay according to one example embodiment of the disclosure.

According to a technique disclosed in JP-A No. 2011-210385, a relay is turned off with electric power supply to contacts of the relay being maintained. However, the possibility of freezing still remains depending on a condition after the relay is turned off. Once freezing occurs at the contacts, the contacts are electrically insulated from each other by ice generated by the freezing when the relay is turned on upon activation of the vehicle. This hinders appropriate electric power supply to the contacts.

It is desirable to provide a control apparatus that makes it possible to appropriately address freezing at contacts of a relay.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided as needed. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 schematically illustrates a vehicle 1 including a relay 10 according to an example embodiment of the disclosure. The vehicle 1 may be an engine vehicle including an engine 4 as a drive source for traveling. Alternatively, the vehicle 1 may be a hybrid vehicle including an engine and a motor as drive sources for traveling, or an electric vehicle including a motor as a drive source for traveling.

The vehicle 1 may include an engine room 3 inside an engine hood 2 provided at a front portion of the vehicle 1. In the engine room 3, various devices such as a drive unit, a cooling unit, an air-conditioning unit, a power source, a control apparatus, and a sensor may be disposed. For example, the engine 4, a radiator 5, and a non-illustrated transmission may be disposed in the engine room 3. In addition, a relay box 8 accommodating the relay 10 may be disposed in the engine room 3. In the example illustrated in FIG. 1, the relay box 8 may be disposed at a left rear upper side in the engine room 3. However, the relay box 8 may be disposed at another position in the engine room 3. Being accommodated in the relay box 8, the relay 10 is prevented from easily receiving moisture, dust, or other debris therein.

The relay 10 may be a main relay coupled to between a control apparatus 12 and a power source 7, for example. The control apparatus 12 may correspond to an example of an electric load. The relay 10 may be a switching device that turns on and off electric power supply from the power source 7 to the control apparatus 12. That is, the control apparatus 12 may switch between execution of electric power supply and interruption of electric power supply. For example, the relay 10 may be used to turn on or off electric power supply necessary to control various devices such as the engine 4 or the transmission.

The control apparatus 12 may be an electronic control unit (ECU) that controls, for example, an air-fuel ratio, an ignition timing, and an electronically controlled throttle of the engine 4. The control apparatus 12 may be a transmission control unit (TCU) that controls the transmission, or may be a control unit that controls other various in-vehicle devices.

The relay 10 may not be coupled to between the control apparatus 12 and the power source 7. For example, the relay 10 may be coupled to between an electric load other than the control apparatus 12 and the power source 7. The electric load may be, for example, a driving unit for a vehicle drive motor or other motors, or an in-vehicle electrical component of various types to be driven by electric power. Examples of the in-vehicle electrical component may include an auxiliary device, a cooling unit, an air-conditioning unit, a sensor, a car navigator, a display, an acoustic system, and an electric slide door. That is, the relay 10 may be any relay other than the main relay.

The power source 7 may be a battery that stores electric power to be supplied to the electric load. The power source 7 may be a battery to be mounted on the vehicle 1, such as an auxiliary battery. However, the power source 7 is not limited these examples and may be any battery to be mounted on the vehicle 1. For example, the power source 7 may be a high-voltage battery for a drive motor of a hybrid vehicle or an electric vehicle. Alternatively, the power source 7 may be an external power source.

Figure 2:
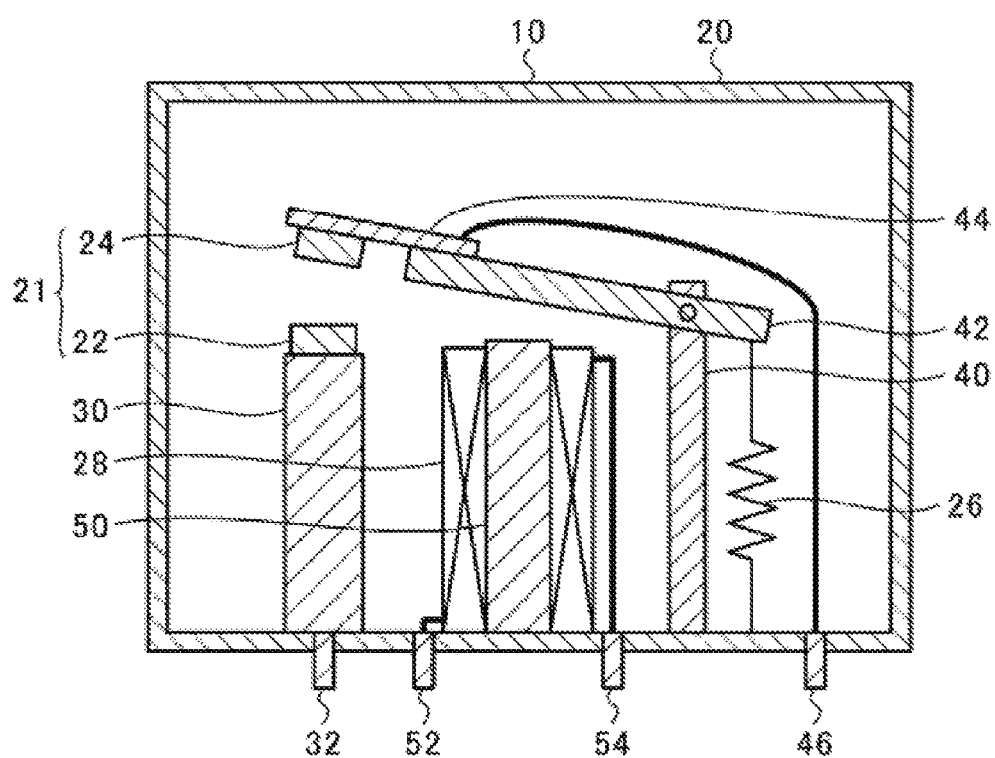
FIG. 2 is a vertical cross-sectional view of an exemplary configuration of the relay according to one example embodiment of the disclosure to be mounted on the vehicle.

FIG. 2 illustrates an exemplary vertical cross-sectional configuration of the relay 10 to be mounted on the vehicle 1 according to the example embodiment of the disclosure. As illustrated in FIG. 2, the relay 10 may be a mechanical relay such as an electromagnetic relay. The mechanical relay may have contacts that mechanically move closer to or away from each other. Note that the configuration of the relay 10 is not limited to the exemplary configuration illustrated in FIG. 2 and may be any configuration including a mechanical relay.

The relay 10 may include a case 20, a fixed contact 22, a movable contact 24, an urging member 26, and an exciting coil 28. The case 20 may be a hollow box including an insulating material such as synthetic resin, for example. The fixed contact 22, the movable contact 24, the urging member 26, and the exciting coil 28 may be accommodated in the case 20. Hereinafter, the fixed contact 22 and the movable contact 24 may be collectively and simply referred to as contacts 21 as needed.

The fixed contact 22 may be held by the case 20 with the fixing base 30 interposed therebetween. The fixed contact 22 may be disposed in the case 20 in a fixed manner. The fixed contact 22 may have a columnar shape, for example. The fixing base 30 may extend upwardly from an inner bottom face of the case 20. A first end of the fixed contact 22 in a central axis direction may be coupled to a top portion of the fixing base 30. A second end of the fixed contact 22 that is opposite to the first end adjacent to the fixing base 30 in the central axis direction may have a flat surface. Hereinafter, the surface at the second end of the fixed contact 22 may also be referred to as a second end face or a contact face of the fixed contact 22.

The fixing base 30 may have a base end to which a fixing terminal 32 is coupled. The fixing terminal 32 may project to outside the case 20. The fixed contact 22, the fixing base 30, and the fixing terminal 32 may include, for example, an electrically conductive material such as a metal material. Examples of the metal material may include copper, iron, and phosphor bronze. The fixed contact 22, the fixing base 30, and the fixing terminal 32 may be formed as a single metal component or an assembly of multiple components. The fixed contact 22 may be electrically coupled to the fixing terminal 32 via the fixing base 30.

The movable contact 24 may be held by the case 20 with a movable base 40, a movable member 42, and an extension 44 interposed therebetween. The movable contact 24 may be disposed in the case 20 in a movable manner. The movable contact 24 may have a columnar shape, for example. The movable base 40 may extend upwardly from the inner bottom face of the case 20. The movable base 40 may have a top portion to which the movable member 42 is joined. The movable member 42 may extend from the movable base 40 to the vicinity of the fixed contact 22. The movable member 42 may be pivotable about the joint between the movable member 42 and the movable base 40. The movable member 42 may include a magnetic material such as iron, for example. The movable member 42 may have a top portion to which the extension 44 is coupled. The extension 44 may be an extension of the movable member 42. A first end of the movable contact 24 in the central axis direction may be coupled to a surface of the extension 44 facing the bottom face of the case 20. A second end of the movable contact 24 that is the opposite to the first end of the movable contact 24 in the central axis direction may have a flat surface. Hereinafter, the surface at the second end of the movable contact 24 may also be referred to as a second end face or a contact face of the movable contact 24.

The case 20 may be further provided with a movable terminal 46 projecting to outside the case 20. The movable contact 24, the extension 44, and the movable terminal 46 may include, for example, an electrically conductive material such as a metal material. Examples of the metal material may include copper, iron, and phosphor bronze. The movable contact 24 and the extension 44 may be formed as a single metal component or an assembly of multiple components. The movable terminal 46 may be electrically coupled to the extension 44 with an electric wiring line, for example. The movable contact 24 may be electrically coupled to the movable terminal 46 via the extension 44 and the electric wiring line.

The movable contact 24 may be disposed opposite to the fixed contact 22. The movable contact 24 may be held by the movable member 42 with the extension 44 interposed therebetween, and thus movable closer to or away from the fixed contact 22 in conjunction with pivotal movement of the movable member 42. When the movable contact 24 moves away from the fixed contact 22, the movable contact 24 may be electrically decoupled from the fixed contact 22. In a state where the movable contact 24 moves closer to the fixed contact 22, the second end face of the movable contact 24 may come into contact with the second end face of the fixed contact 22. When the movable contact 24 comes into contact with the fixed contact 22, the movable contact 24 may be electrically coupled to the fixed contact 22. Hereinafter, the movement of the movable contact 24 closer to the fixed contact 22 may be represented as "the relay is turned on", and the movement of the movable contact 24 away from the fixed contact 22 may be represented as "the relay is turned off" as needed.

The urging member 26 may be a spring, for example. Alternatively, the urging member 26 may be a flat spring or a rubber member. The urging member 26 may be provided between the movable member 42 and the case 20, for example. Alternatively, the urging member 26 may be provided between the movable member 42 and the movable base 40. The urging member 26 may urge the movable contact 24 in a direction away from the fixed contact 22.

An iron core 50 having a column shape may extend upward from the bottom of the case 20. The iron core 50 may be disposed below the movable member 42. The exciting coil 28 may be wound around the iron core 50.

In the case 20, a first exciting terminal 52 and a second exciting terminal 54 may be provided. The first exciting terminal 52 and the second exciting terminal 54 may project to outside the case 20. The first exciting terminal 52 and the second exciting terminal 54 may each include an electrically conductive material such as a metal material. Examples of the metal material may include copper, iron, and phosphor bronze. The first exciting terminal 52 and the second exciting terminal 54 may be each electrically coupled to the exciting coil 28.

The exciting coil 28 may be supplied with an electric current through the first exciting terminal 52 and the second exciting terminal 54. When being supplied with an electric current, the exciting coil 28 may serve as an electromagnet. The iron core 50 may be provided to enhance an effect of the electromagnet.

When the exciting coil 28 is not supplied with an electric current, the movable member 42 may be urged by the urging member 26 in the direction away from the fixed contact 22. In this case, the movable contact 24 may be distant from the fixed contact 22 and thus electrically decoupled from the fixed contact 22. In other words, the relay 10 may be turned off.

In contrast, when electric current is supplied to the exciting coil 28, the exciting coil 28 may serve as an electromagnet and draw the movable member 42. The movable member 42 may be moved closer to the exciting coil 28 by magnetic energy of the exciting coil 28 overcoming the urging force of the urging member 26. In this case, the movable contact 24 may be moved together with the movable member 42 in the direction toward the fixed contact 22 and brought into contact with the fixed contact 22. In other words, the relay 10 may be turned on. While an electric current the causes the exciting coil 28 to generate a magnetic force overcoming the urging force of the urging member 26 flows in the exciting coil 28, the relay 10 may be maintained in an on-state.

When electric current supply to the exciting coil is stopped, the exciting coil 28 may generate no magnetic force and thus stop drawing the movable member 42. Accordingly, the movable member 42 and the movable contact 24 may be moved in the direction away from the fixed contact 22 by the urging force of the urging member 26. In other words, the relay 10 may be turned off. In this manner, the relay 10 may be turned on by moving the movable contact 24 closer to the fixed contact 22, while the relay 10 may be turned off by moving the movable contact 24 away from the fixed contact 22.

Figure 3:
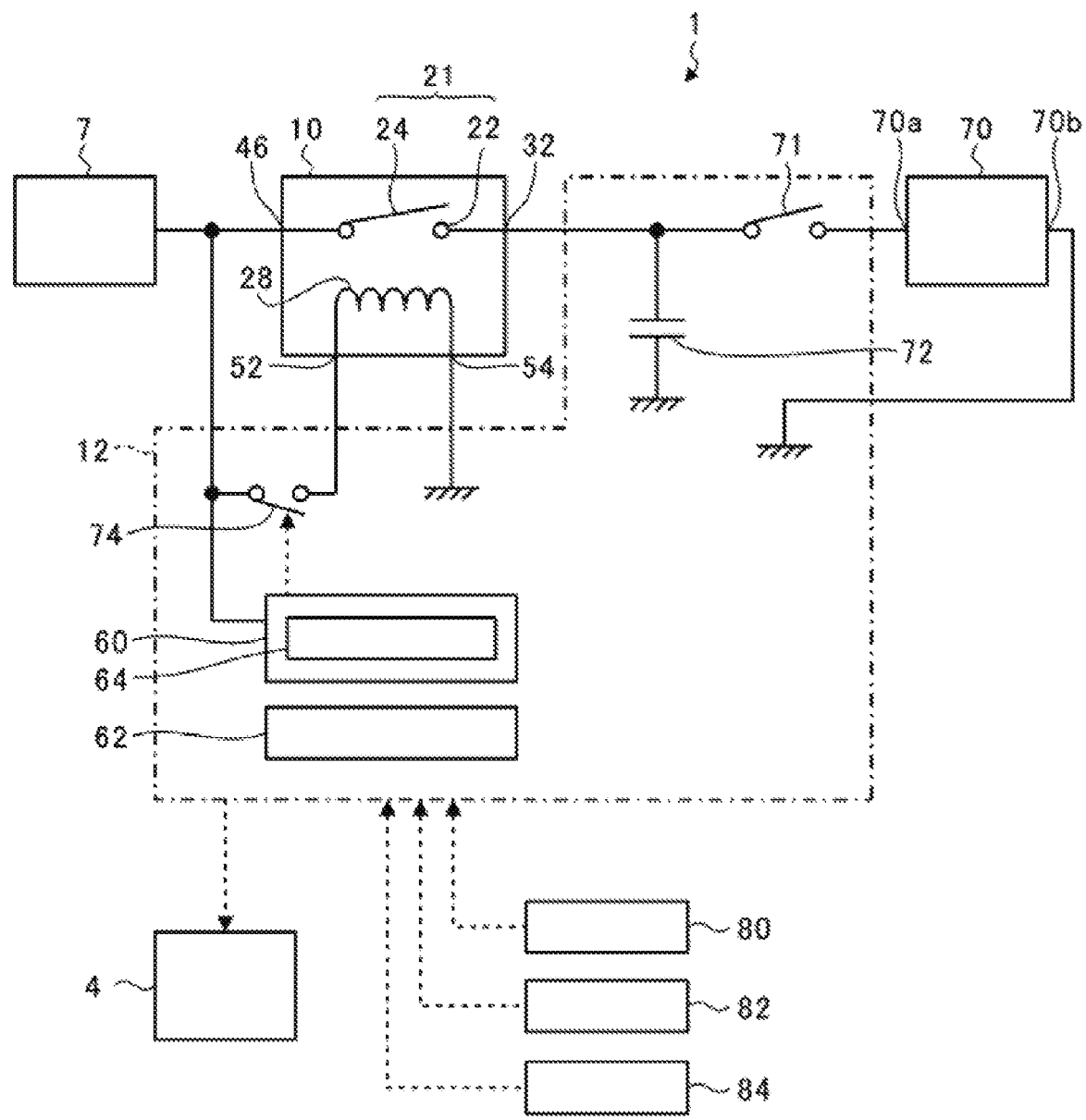
FIG. 3 is a block diagram of an exemplary coupling configuration between the relay and a control apparatus according to one example embodiment of the disclosure.

FIG. 3 is a block diagram illustrating an exemplary coupling configuration between the relay 10 and the control apparatus 12 according to the example embodiment. The control apparatus 12 includes one or more processors 60 and one or more memories 62 coupled to the one or more processors 60. The memory 62 may include a read-only memory (ROM) that stores programs, for example, and a random access memory (RAM) that serves as a work area. The processor 60 of the control apparatus 12 may control an overall operation of the vehicle 1 in cooperation with the program stored in the memory 62. For example, the processor 60 may control the engine 4. The processor 60 may also serve as a relay control unit 64 that controls the relay 10. The relay control unit 64 will be described later.

In the example illustrated in FIG. 3, the power source 7 may be electrically coupled to the movable terminal 46 of the relay 10 to supply electric power to the movable contact 24. The fixing terminal 32 of the relay 10 may be electrically coupled to a component to be controlled, such as an electronic component 70 of various types, via the control apparatus 12. The electronic component 70 may be, for example, an electronically controlled throttle. However, the electronic component 70 is not limited to this example and may be any electronic component. When the relay 10 is turned on, the power source 7 may supply electric power to the electronic component 70. In the example illustrate in FIG. 3, the power source 7 may be coupled to the movable terminal 46. However, the power source 7 may be coupled to the fixing terminal 32. In this case, the electronic component 70 may be coupled to the movable terminal 46 via the control apparatus 12.

The control apparatus 12 may include a control switch 71. The control switch 71 may be, for example, a semiconductor switch. The control switch 71 may be electrically coupled to between the relay 10 and the electronic component 70. For example, a first terminal of the control switch 71 may be coupled to the fixing terminal 32 and may be electrically coupled to the power source 7 via the relay 10. A second terminal of the control switch 71 may be coupled to a first terminal 70a of the electronic component 70. A second terminal 70b of the electronic component 70 may be grounded. Note that the control switch 71 is not limited to the example of the control switch 71 that is coupled to the first terminal 70a of the electronic component 70, and may be coupled to the second terminal 70b of the electronic component 70. The processor 60 may perform ON/OFF control of the control switch 71 by, for example, controlling an electric current or a voltage applied to a control terminal of the control switch 71 which is a semiconductor switch. When the relay 10 and the control switch 71 are turned on, the power source 7 may supply electric power to the electronic component 70.

The control apparatus 12 may include a capacitor 72. A first electrode of the capacitor 72 may be coupled to the fixing terminal 32 of the relay 10 and may be coupled to the electronic component 70 via the control switch 71. A second electrode of the capacitor 72 may be grounded. The capacitor 72 may smooth electric power to be supplied to the electronic component 70 or the control apparatus 12.

The power source 7 may be electrically coupled also to the processor 60 and may supply electric power also to the processor 60.

The control apparatus 12 may include an exciting switch 74. The exciting switch 74 may be, for example, a semiconductor switch. The exciting switch 74 may be electrically coupled to between the exciting coil 28 and the power source 7. For example, a first terminal of the exciting switch 74 may be coupled to the power source 7, and a second terminal of the exciting switch 74 may be coupled to the first exciting terminal 52. The second exciting terminal 54 may be grounded. Note that the exciting switch 74 is not limited to the example of the exciting switch 74 that is coupled to the first exciting terminal 52, and may be coupled to the second exciting terminal 54. The processor 60 may perform ON/OFF control of the exciting switch 74 by, for example, controlling an electric current or a voltage to be applied to a control terminal of the exciting switch 74 which is a semiconductor switch. When the exciting switch 74 is turned on, the power source 7 may supply electric power to the exciting coil 28.

The vehicle 1 may include an outside air temperature sensor 80, a water temperature sensor 82, and an ignition switch 84. The outside air temperature sensor 80 may detect an ambient temperature outside the vehicle 1, that is, an outside air temperature. The water temperature sensor 82 may detect the temperature of a cooling water that cools the engine 4. The water temperature sensor 82 may indirectly detect the temperature of the engine 4, which is a drive source, by detecting the temperature of the cooling water. That is, the water temperature sensor 82 may serve as a drive-source temperature sensor that detects the temperature of the drive source.

The ignition switch 84 may receive an ignition-on (IG-ON) operation or an ignition-off (IG-OFF) operation performed by an occupant. When receiving the IG-ON operation, the ignition switch 84 may send a start signal to start the engine 4, which is the drive source, to the control apparatus 12. When receiving the start signal, sent in response to the IG-ON operation, from the ignition switch 84, the relay control unit 64 may turn on the relay 10 to start the engine 4. When receiving the IG-OFF operation, the ignition switch 84 may send a stop signal to stop the engine 4, which is the drive source, to the control apparatus 12. When receiving the stop signal, sent in response to the IG-OFF operation, from the ignition switch 84, the relay control unit 64 may turn off the relay 10 after stopping the engine 4.

If the relay 10 satisfies a predetermined temperature condition after being turned off in accordance with the stop of the engine 4, freezing may occur at the contacts 21 of the relay 10. Once freezing occurs, the contacts 21 may be electrically insulated from each other by ice generated by the freezing when the relay 10 is turned on upon activation of the vehicle 1. This hinders appropriate electric power supply to the contacts 21.

To address such an issue, in a condition in which ice is expected to be generated due to freezing, the relay 10 is intentionally turned on and off by the relay control unit 64 to cause the movable contact 24 to collide against the fixed contact 22 to thereby crush the ice on the contacts 21. Hereinafter, the operation to crush the ice may be referred to as an ice-crashing operation as needed. In the following, the condition in which freezing occurs is described first, following which control of the ice-crashing operation to be performed by the relay control unit 64 is described.

Figure 4:
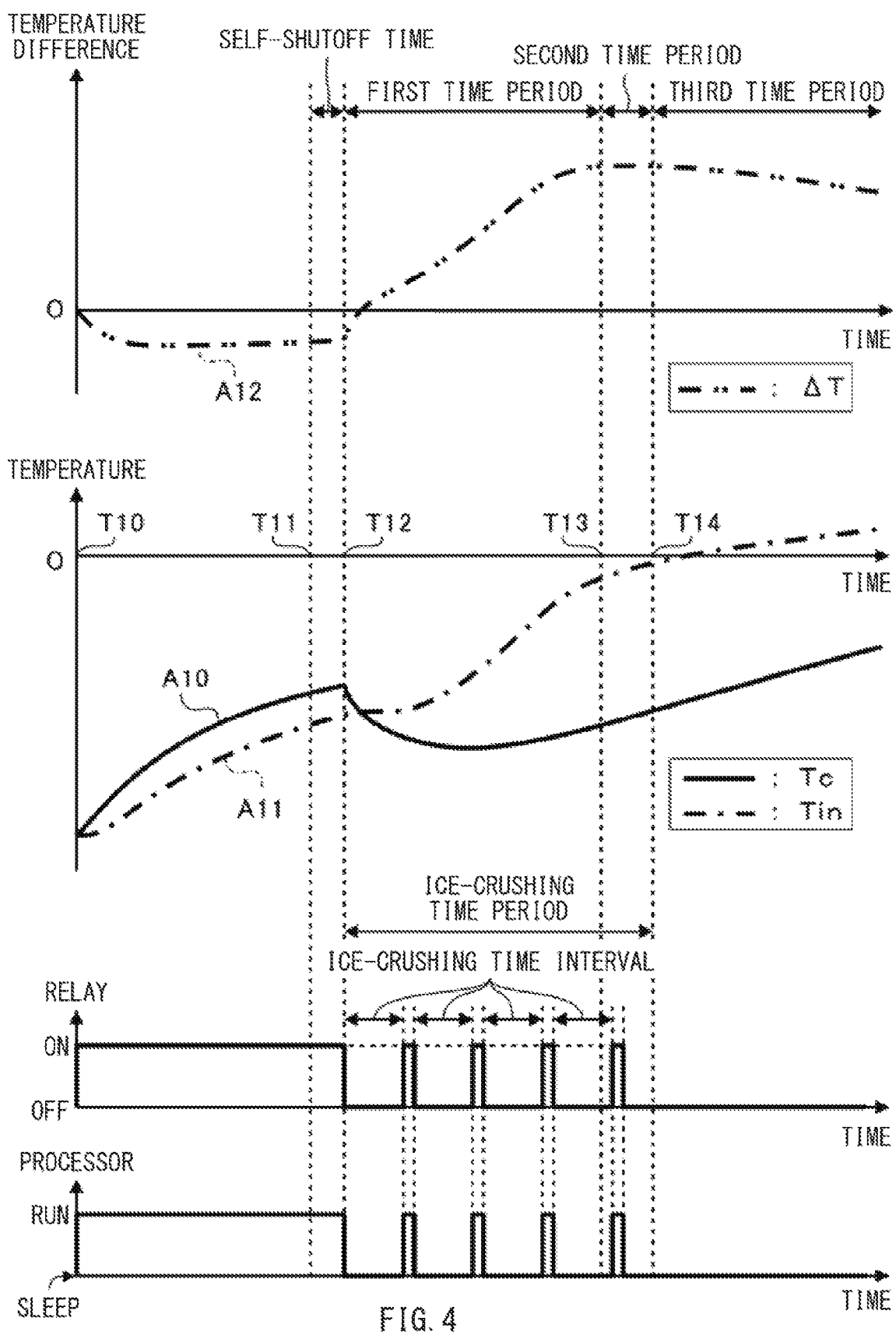
FIG. 4 is a timing chart for explaining occurrence of freezing and an exemplary operation of a relay control unit according to one example embodiment of the disclosure.

FIG. 4 is a timing chart illustrating the occurrence of freezing and an exemplary operation of the relay control unit 64 according to the example embodiment. The timing chart illustrated in FIG. 4 may include four parts. In the second top part of the timing chart illustrated in FIG. 4, a solid line A10 indicates an exemplary temporal change of a temperature Tc of the contact 21 of the relay 10. In this example, the temperature of the fixed contact 22 may be employed as the temperature Tc in view of the fact that the temperature of the fixed contact 22 is easier to decrease than the temperature of the movable contact 24. However, the temperature of the movable contact 24 may be employed as the temperature. A dashed-dotted line A11 in the second top part of the timing chart indicates an exemplary temporal change of a temperature Tin of the internal atmosphere inside the relay 10. In the first top part of the timing chart, a dashed-two dotted line A12 indicates a temperature difference ΔT obtained by subtracting the temperature Tc of the contact 21 of the relay 10 from the temperature Tin of the internal atmosphere inside the relay 10 (ΔT=Tin−Tc). In this example, the temperature difference ΔT may be obtained by subtracting the temperature of the fixed contact 22 from the temperature Tin of the internal atmosphere inside the relay 10. However, the temperature difference ΔT may be obtained by subtracting the temperature of the movable contact 24 from the temperature Tin of the internal atmosphere inside the relay 10. The third top part of the timing chart illustrates an exemplary state of the contacts 21 of the relay 10. The fourth top part of the timing chart illustrates an exemplary state of the processor 60 serving as the relay control unit 64. The first to fourth parts of the timing chart may have a common time axis. Hereinafter, the temperature Tc of the contact 21 of the relay 10 may be simply referred to as the temperature Tc, and the temperature Tin of the internal atmosphere inside the relay 10 may be simply referred to as the temperature Tin as needed.

In the example illustrated in FIG. 4, the outside air temperature may be a sub-zero temperature, that is, less than or equal to 0° C. at a time point T10. At the time point T10, the IG-ON operation may be performed, and the relay control unit 64 may turn on the relay 10 in response to the IG-ON operation. Further, at the time point T10, the relay control unit 64 may start the engine 4 as well as turning on the relay 10. At the time point T10, the temperature Tc of the contact 21 and the temperature Tin of the internal atmosphere may both be sub-zero and substantially identical to each other.

When the engine 4 is started at the time point T10, the engine 4 may be warmed, and the internal space of the engine room 3 may be gradually warmed by heat generated by the engine 4. Accordingly, the air inside the relay box 8 disposed inside the engine room 3 may also be gradually warmed, and the case 20 of the relay 10 disposed inside the relay box 8 may thus be gradually warmed. As a result, as indicated by the dashed-dotted line A11, the temperature Tin of the internal atmosphere, that is, the temperature of the air inside the case 20 of the relay 10 may be gradually increased.

Further, when the relay 10 is turned on at the time point T10, the movable contact 24 may be brought into contact with fixed contact 22, causing an electric current to flow between the contacts 21. When being supplied with electric power, the contacts 21 may generate heat and rise in the temperature Tc as indicated by the solid line A10. The contacts 21 including an electrically conductive material may have a heat capacity larger than the heat capacity of the air. Thus, the temperature Tc of the contact 21 indicated by the solid line A10 may rise earlier than the temperature Tin of the internal atmosphere indicated by the dashed-dotted line A11. Further, when the vehicle 1 starts traveling after the time point T10, a traveling wind may be supplied to the engine room 3, which cools the case 20 of the relay 10. The internal atmosphere inside the relay 10 may be cooled and prevented from rising in temperature more easily by the traveling wind than the contacts 21 of the relay 10 are. Accordingly, even if the temperature Tc of the contact 21 is sub-zero, freezing will not occur at the contacts 21 because the temperature Tc of the contact 21 is greater than or equal to the temperature Tin of the internal atmosphere.

At a time point T11, the IG-OFF operation may be performed. When receiving the stop signal sent in response to the IG-OFF at the time point T11, the relay control unit 64 may stop the engine 4. After stopping the engine 4, the relay control unit 64 may perform a self-diagnosis of each device, such as the electronic component 70. Some devices to be subjected to the self-diagnosis are to be operated when being diagnosed. For example, in order to perform the self-diagnosis of an electrically controlled throttle, the relay control unit 64 may cause the electrically controlled throttle to operate. In other words, it may be necessary to supply electric power to a device to be diagnosed. Accordingly, the relay control unit 64 may maintain the relay 10 in the on-state and maintain electric power supply to a device to be diagnosed after the stop of the engine 4 at least until the self-diagnosis ends. After the self-diagnosis ends, the relay control unit 64 may turn off the relay 10. In the example illustrate in FIG. 4, the relay control unit 64 may turn off the relay 10 at a time point T12. Hereinafter, the time period from the stop of the drive source (the time point T11) to the turning off of the relay 10 may be referred to as a self-shutoff time, as needed.

When the relay 10 is tuned off, the contacts 21 may be electrically insulated from each other and thus generate no heat. Further, heat of the fixed contact 22 may be dissipated via the fixing terminal 32 exposed to outside the relay 10, and heat of the movable contact 24 may be dissipated via the movable terminal 46 exposed to outside the relay 10. Accordingly, as indicated by the solid line A10, the temperature Tc of the contact 21 may decrease after the time point T12.

The engine 4 may have a large mass and a large heat capacity. Thus, a lot of amount of heat may be stored in the engine 4 by warming before the time point T11. After stopping at the time point T11, the engine 4 may gradually dissipate heat stored therein to inside the engine room 3. This allows the case 20 of the relay 10 to be warmed by the heat discharged from the engine 4 even after the relay 10 is turned off at the time point T12. After the engine 4 is stopped, the case 20 of the relay 10 may not be cooled by a traveling wind. Accordingly, the temperature Tin of the internal atmosphere may increase after the time point T12 as indicated by the dashed-dotted line A11.

As described above, the temperature Tc of the contact 21 may decrease, while the temperature Tin of the internal atmosphere may increase. Thus, after the time point T12, as indicated by the dashed-two dotted line A12, the temperature difference ΔT, which is obtained by subtracting the temperature Tc of the contact 21 from the temperature Tin of the internal atmosphere, may increase. As a result, a condition may be generated where the temperature Tc of the contact 21 is sub-zero and where the temperature Tc of the contact 21 is lower than the temperature Tin of the internal atmosphere. In such a condition, freezing may occur at the contacts 21. For example, water vapor in the air inside the relay 10 may come into contact with the contacts 21 having a temperature lower than the temperature of the air inside the relay 10 to thereby reach a saturation point, and then condense into water on the contacts 21. The water generated as a result of the condensation may come into contact with the contacts 21 having a sub-zero temperature to thereby generate ice on the contacts 21. The ice may grow while water is collected around the ice nucleus. As the temperature difference ΔT between the temperature Tc of the contact 21 and the temperature Tin of the internal atmosphere increases, it may become easier to generate and grow the ice on the contacts 21.

As described above, after the time point T12, heat of the contacts 21 may be dissipated. After the end of the heat dissipation of the contacts 21, the contacts 21 may be warmed by the heat discharged from the engine 4, as in the case with the case 20 of the relay 10. Accordingly, as indicated by the solid line A10, the temperature Tc of the contact 21 may turn from a decrease to an increase. Accordingly, as indicated by the dashed-two dotted line A12, an increment in the temperature difference ΔT may decrease. Thereafter, the increase in the temperature difference ΔT may turn to be constant with time, and then decrease. Thereafter, the temperature Tc of the contact 21 and the temperature Tin of the internal atmosphere may eventually become substantially identical to each other with time.

The time period from the time point T12 to time point T13 illustrated in FIG. 4 may correspond to a first time period in which the temperature difference ΔT between the temperature Tc of the contact 21 and the temperature Tin of the internal atmosphere increases with time. The time period from the time point T13 to a time point T14 may correspond to a second time period in which the temperature difference ΔT between the temperature Tc of the contact 21 and the temperature Tin of the internal atmosphere is substantially constant. The time period after the time point T14 may correspond to a third time period in which the difference ΔT between the temperature Tc of the contact 21 and the temperature Tin of the internal atmosphere decreases with time. Although not illustrated, the third time period may be a time period before the temperature Tc of the contact 21 and the temperature Tin of the internal atmosphere become substantially identical to each other.

As described above, the relay control unit 64 may stop the engine 4 in accordance with the IG-OFF at the time point T11, and may turn off the relay 10 at the time point T12. At the time point T12 when the relay 10 is turned off, the relay control unit 64 may determine whether an ice generation condition is satisfied on the basis of one or both of a state of a heat source of the vehicle 1 and the outside air temperature.

Herein, the heat source may be disposed around the relay 10 and serve as a factor to increase the temperature of the internal atmosphere inside the relay 10. Examples of the heat source may include the engine 4, which is the drive source. Note that the heat source is not limited to the drive source, and may be any device that is disposed around the relay 10 and configured to generate heat. Examples of the device may include an in-vehicle air conditioning device. The state of the heat source may include the temperature of the heat source and the presence or absence of an operation of the device serving as the heat source.

The ice generation condition may be a condition in which ice is expected to be generated on the contacts 21 of the relay 10 due to freezing. For example, the ice generation condition may be a temperature condition that the outside air temperature is sub-zero temperature and that the temperature of the drive source is greater than or equal to a predetermined temperature. For example, the relay control unit 64 may acquire a water temperature detected by the water temperature sensor 82 as the temperature of the drive source from the water temperature sensor 82, and may acquire the outside air temperature from the outside air temperature sensor 80. In a case where the outside air temperature acquired from the outside air temperature sensor 80 is a sub-zero temperature and where the water temperature acquired from the water temperature sensor 82 is greater than or equal to a predetermined water temperature, the relay control unit 64 may determine that the ice generation condition is satisfied. The predetermined water temperature may be set to a threshold temperature for determining whether the engine 4 is sufficiently warmed. For example, the predetermined water temperature may be 70° C.

Note that the ice generation condition is not limited to the condition that the outside air temperature is a sub-zero temperature and that the temperature of the drive source is greater than or equal to the predetermined temperature. For example, the ice generation condition may be a condition that there is a history of activation of a predetermined device serving as a heat source in one driving cycle from the IG-ON to the IG-OFF, regardless of whether the outside air temperature is a sub-zero temperature. That is, in this example, it may be determined that freezing is expected to occur, assuming that the heat source has reached the predetermined temperature or higher or that a predetermined temperature difference has been generated between the outside air temperature and the temperature of the heat source at the time point T12 when the relay 10 is turned off in accordance with the IG-OFF. Alternatively, the ice generation condition may be a condition that the outside air temperature is a sub-zero temperature and that there is a history of activation of a predetermined device serving as a heat source in one driving cycle. Still alternatively, the ice generation condition may be a condition only that the outside air temperature is a sub-zero temperature, regardless of the states of the heat source, such as the temperature of the heat source or the activation history of the heat source. As described above, the ice generation condition may be set on the basis of one or both indices of the state of the heat source and the outside air temperature.

In a case where it is determined that the ice generation condition is satisfied, as indicated in the third top part of the timing chart in FIG. 4, after the time point T12, the relay control unit 64 may turn on the relay 10 having been turned off and thereafter may turn off the relay 10 to thereby perform an ice-crushing operation in which the movable contact 24 collides against the fixed contact 22. The relay control unit 64 may intermittently repeat the ice-crushing operation at a predetermined ice-crushing time interval in a predetermined ice-crushing time period.

In the ice-crushing operation, the relay control unit 64 may turn off the relay 10 without delay after turning on the relay 10. The time gap between the time when the relay 10 is turned on and the time when the relay 10 is turned off in the ice-crushing operation may be set to be sufficiently shorter than the ice-crushing time interval to reduce electric consumption. The time gap may be, for example, one second or shorter. However, the time gap is not limited to this example and may be set as desired.

When the relay 10 is turned on in the ice-crushing operation, the movable contact 24 may collide against the fixed contact 22. The impact of the collision between the contacts 21 makes it possible to crush ice generated on the contact face of the fixed contact 22 with which the movable contact 24 is to be brought into contact or ice generated on the contact face of the movable contact 24 which is to come into contact with the fixed contact 22, if any. It is possible to remove the ice generated on the face of the fixed contact 22 by crushing the ice on the contacts 21 through the ice-crushing operation. This suppress the occurrence of electrical insulation between the contacts 21.

In the ice-crushing operation, the ice on the contact face of the fixed contact 22 and the ice on the contact face of the movable contact 24 may be directly crushed. This suppresses the growth of the ice on the contact faces. Note that it may be difficult to directly crush ice generated on a side face of the fixed contact 22 and a side face of the movable contact 24. This may result in the growth of the ice on the contact 24. However, the growth of the ice on the side faces may be barely involved in electrical insulation between the contacts 21. Thus, the growth of the ice on the side face may be acceptable.

If the state in which freezing is easy to occur is maintained after the ice-crushing operation, freezing can occur at the contacts 21 again. However, the ice-crushing operation intermittently repeated by the relay control unit 64 at the ice-crushing time interval makes it possible to crush the ice generated again on the contacts 21.

The ice-crushing time interval may be a time interval between two adjacent ice-crushing operations of the repetitive ice-crushing operations. For example, as indicated in the third top part of the timing chart illustrated in FIG. 4, the ice-crushing time interval may be a time period from turning-off of the relay 10 to turning-on of the relay 10. The ice-crushing time interval may be set to a time period in which the ice on the contacts 21 of the relay 10 grows to a predetermined size. The predetermined size of the ice may be set to a size smaller than or equal to a maximum size that is crushable in the single ice-crushing operation. This helps to surely crush and remove the ice on the contacts 21 of the relay 10 by the ice-crushing operation performed at the ice-crushing time interval.

The inventors performed an experiment regarding the ice-crushing time interval. As a result of the experiment, the possibility of crushing the ice was increased when the ice-crushing time interval was 4 minutes or shorter, whereas the possibility of crushing the ice was decreased when the ice-crushing time interval was longer than 4 minutes. That is, in this example, 4 minutes may correspond to a time period in which the ice on the contacts 21 of the relay 10 grows to the maximum size that is crushable in the single ice-crushing operation. In addition, as the ice-crushing time interval becomes shorter, the electric consumption for turning on and off the relay 10 can increase. To address such a concern, the ice-crushing time interval may be within a range from 30 seconds to 4 minutes both inclusive. In a case where the ice-crushing time interval is within the range from 30 seconds to 4 minutes both inclusive, the ice-crushing operation may be performed while the ice on the contacts 21 is relatively small and soft. This helps to easily crush the ice on the contacts 21. For example, the ice-crushing time interval may be set to one minute. However, the ice-crushing time interval is not limited to 1 minute as in this example and may be set to any time period within the range from 30 seconds to 4 minutes both inclusive.

As illustrated in the third top part of the timing chart of FIG. 4, the ice-crushing time period may start from the time point T12 when the relay 10 is turned off in accordance with the stop of the operation of the drive source. The ice-crushing time period may be determined on the basis of the temperature difference $\Delta T$ between the temperature Tc of the contact 21 and the temperature Tin of the internal atmosphere. That is, the ice-crushing time period may be set to a time period in which at least the temperature difference $\Delta T$ is generated. For example, the ice-crushing time period may be set to a time period obtained by combining the first and second time periods. In this case, the ice-crushing operation may not be performed in the third time period. In the third time period, the temperature difference ΔT may decrease, which retards the growth of the ice. Accordingly, the possibility of the growth of the ice in the third time period may be lowered by performing the ice-crushing operation to crush the ice before the third time period. The ice-crushing time period may be longer than the ice-crushing time interval and may be, for example, about 20 minutes to about 30 minutes. However, the ice-crushing time period may be set as desired.

Note that the ice-crushing time period is not limited to the time period obtained by combining the first and second time periods. The ice-crushing time period may be set to the first time period, or may be set to the time period obtained by combining the first, second, and third time periods. In one example, the ice-crushing time period may include the time period in which the temperature difference ΔT increases with time, i.e., the first time period. In this case, the relay control unit 64 makes it possible to appropriately crush the ice by performing the ice-crushing operation in the first time period in which the ice is easy to grow.

The ice-crushing time period and the ice-crushing time interval may differ depending on the specifications of the relay 10 or the engine 4. For example, the ice-crushing time period and the ice-crushing time interval may be determined in advance for each specification of the relay 10 and the engine 4 through an experiment or a simulation. The ice-crushing time period and the ice-crushing time interval determined in advance may be preliminarily stored in the memory 62.

Alternatively, the ice-crushing time interval may be set within the range from 30 seconds to 4 minutes both inclusive on the basis of the magnitude of an inrush current flowing between the movable contact 24 and the fixed contact 22 when the relay 10 is turned on in the ice-crushing operation. The magnitude of the inrush current may increase as the electrostatic capacity of the capacitor 72 coupled to the movable contact 24 or the fixed contact 22 increases.

For example, at the timing when the relay 10 is turned on in the ice-crushing operation, an inrush current having a current value greater than that of a constant current may temporarily flow between the fixed contact 22 and the movable contact 24 to charge the capacitor 72. Accordingly, the impact of a collision between the contacts 21, heat due to the inrush current, and/or heat due to arc-discharging at the time of electrical decoupling caused by bouncing of the movable contact 24 after the collision of the contacts 21 may be generated between the fixed contact 22 and the movable contact 24. The heat generated by the inrush current may increase as the inrush current increases. The ice on the contacts 21 may be crushed by both of the impact of a collision between the fixed contact 22 and the movable contact 24, and the heat generated by the inrush current flowing between the fixed contact 22 and the movable contact 24. That is, even if it is difficult to crush the ice only by the impact of the collision between the fixed contact 22 and the movable contact 24, the heat generated by the inrush current makes it possible to crush the ice. As a result, it is possible to set the ice-crushing time interval to a longer time period as the inrush current increases.

Alternatively, the ice-crushing time interval may be set within the range from 30 seconds to 4 minutes both inclusive depending on the impact force of a collision between the movable contact 24 and the fixed contact 22 caused by turning on the relay 10 in the ice-crushing operation. The impact force may be calculated on the basis of a physical structure of the relay 10. For example, the impact force may be calculated on the basis of the mass of the movable contact 24 and a movable speed of the movable contact 24. The impact force may increase as the mass of the movable contact 24 and the movable speed of the movable contact 24 increase. The mass and movable speed of the movable contact 24 may differ depending on the specifications of the relay 10. Further, the movable speed of the movable contact 24 may vary depending on the magnitude of an electric current flowing in the exciting coil 28. For example, in a case where a current value of the exciting coil 28 increases, the attractive force of the exciting coil 28 may increase, and the movable speed of the movable contact 24 may thus increase.

For example, if it is difficult to crush the ice by a predetermined impact force, it is possible to crush the ice by turning on the relay 10 so that an impact force larger than the predetermined impact force is generated. As a result, it is possible to set the ice-crushing time interval to a longer time period as the impact force between the fixed contact 22 and the movable contact 24 increases.

Note that the ice-crushing time interval may be set within the range from 30 seconds to 4 minutes both inclusive on the basis of both of the magnitude of the inrush current described above and the magnitude of the impact force described above.

Here, the processor 60 serving as the relay control unit 64 may have a running mode and a sleep mode. The running mode may correspond to an ordinary operation mode of the processor 60. In the running mode, the processor 60 may execute various processes. The sleep mode may be a mode in which executable processes are limited as compared with the case in the running mode, and may correspond to a stand-by mode in which electric consumption is reduced. The processor 60 may be switchable between the running mode and the sleep mode. The processor 60 may further perform a self-wakeup operation. In the self-wakeup operation, the processor 60 may autonomously wake up from the sleep mode and switch to the running mode.

As described above, the relay control unit 64 may turn off the relay 10 at the time point T12 which is the start timing of the ice-crushing time period. At the time point T12, the relay control unit 64 may turn off the relay 10 and switch to the sleep mode as illustrated in the fourth top part of the timing chart in FIG. 4.

As illustrated in the fourth top part of the timing chart in FIG. 4, the relay control unit 64 may wake up from the sleep mode after an elapse of the ice-crushing time interval. In other words, the relay control unit 64 may wake up from the sleep mode after the arrival of the execution timing of the ice-crushing operation. After waking up and switching to the running mode, the relay control unit 64 may perform the ice-crushing operation in which the relay 10 is turned on and thereafter turned off without delay. After executing the ice-crushing operation, the relay control unit 64 may switch from the running mode to the sleep mode. The relay control unit 64 may repeatedly wake up to perform the ice-crushing operation and thereafter switch to the sleep mode every time the execution timing of the ice-crushing operation arrives.

As described above, the relay control unit 64 may switch to the running mode only when the ice-crushing operation is to be performed in the ice-crushing time period. This saves electric consumption at the relay control unit 64 as compared with the case where the running mode is maintained in the ice-crushing time period.

Figure 5:
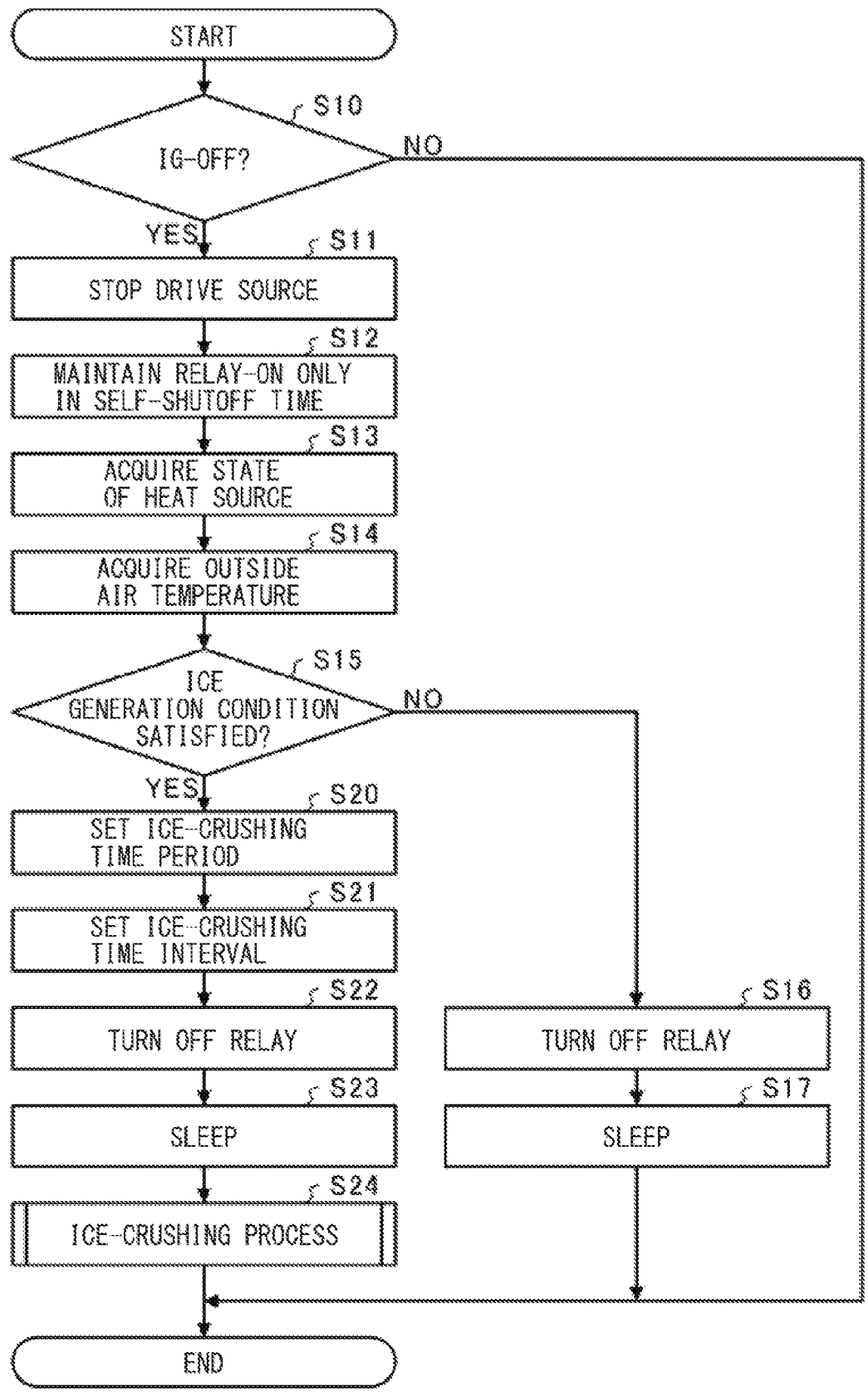
FIG. 5 is a flowchart of an exemplary operation of the relay control unit according to one example embodiment of the disclosure.

FIG. 5 is a flowchart of an exemplary operation of the relay control unit 64 according to the example embodiment. In the IG-ON state, the relay control unit 64 may repeat a series of processes illustrated in FIG. 5 at a predetermined interruption timing that arrives at a predetermined control cycle.

At the predetermined interruption timing, the relay control unit 64 may determine whether a signal indicating the IG-OFF operation has been received from the ignition switch 84 (Step S10). If the signal indicating the IG-OFF operation has not been received yet (Step S10: NO), the relay control unit 64 may end the series of processes illustrated in FIG. 5.

If the signal indicating the IG-OFF has been received (Step S10: YES), the relay control unit 64 may stop the engine 4, which is the drive source (Step S11). Thereafter, the relay control unit 64 may maintain the relay 10 in the on-state only in a predetermined self-shutoff time (Step S12). While the relay 10 is maintained in the on-state, the control apparatus 12 may perform self-diagnosis of each device.

After the self-shutoff time has elapsed, the relay control unit 64 may acquire a state of the heat source (Step S13). Examples of the state of the heat source to be acquired by the relay control unit 64 may include the temperature of the drive source. For example, the relay control unit 64 may acquire the result of detection by the water temperature sensor 82 as the temperature of the drive source. Thereafter, the relay control unit 64 may acquire the outside air temperature from the outside air temperature sensor 80 (Step S14).

Thereafter, the relay control unit 64 may determine whether the ice generation condition is satisfied on the basis of the acquired state of the heat source and the acquired outside air temperature (Step S15). The ice generation condition is a condition in which ice is expected to be generated on the contacts 21 of the relay 10 due to freezing. For example, the relay control unit 64 may determine that the ice generation condition is satisfied in a case where the outside air temperature is a sub-zero temperature and where the temperature of the drive source, which is an example of the state of the heat source, is greater than or equal to a predetermined temperature. The predetermined temperature for the drive source may be set to a threshold temperature for determining whether the drive source has been sufficiently warmed.

If it is not determined that the ice generation condition is satisfied (Step S15: NO), the relay control unit 64 may turn off the relay 10 (Step S16). For example, the relay control unit 64 may turn off the exciting switch 74 to shut off an electric current to be supplied to the exciting coil 28. The attractive force of the exciting coil 28 may be thereby eliminated, and the movable contact 24 may be moved away from the fixed contact 22 by the urging force of the urging member 26. The relay 10 may be thereby turned off. After the relay 10 is turned off, the relay control unit 64 may switch to the sleep mode (Step S17) and end the series of processes.

In contrast, if it is determined that the ice generation condition is satisfied (S15: YES), the relay control unit 64 may perform a setting of the ice-crushing time period (Step S20). For example, the ice-crushing time period for each of the specifications of the drive source and the relay 10 may be preliminarily stored in the memory 62. The relay control unit 64 may read the ice-crushing time period relating to the specifications of the drive source and the relay 10 in the own vehicle from the memory 62 and set the ice-crushing time period.

Thereafter, the relay control unit 64 may perform a setting of the ice-crushing time interval (Step S21). For example, the ice-crushing time interval for each of the specifications of the drive source, the relay 10, and the capacitor 72 may be preliminarily stored in the memory 62. The relay control unit 64 may read the ice-crushing time interval relating to the specifications of the drive source, the relay 10, and the capacitor 72 in the own vehicle from the memory 62 and set the ice-crushing time interval. For example, the ice-crushing time interval may be set to a time interval within the range from 30 seconds to 4 minutes both inclusive.

Thereafter, the relay control unit 64 may turn off the relay 10 (Step S22). For example, the relay control unit 64 may shut off an electric current to be supplied to the exciting coil 28 by turning off the exciting switch 74. The attractive force of the exciting coil 28 may be thereby eliminated, and the movable contact 24 may be moved away from the fixed contact 22 by the urging force of the urging member 26. The relay 10 may be thereby turned off. After the relay 10 is turned off, the relay control unit 64 may switch to the sleep mode (Step S23). Thereafter, the relay control unit 64 may perform an ice-crushing process (Step S24) and end the series of processes. The ice-crushing process may be a process in which a predetermined ice-crushing operation is intermittently repeated at a predetermined ice-crushing time interval in a predetermined ice-crushing time period.

Figure 6:
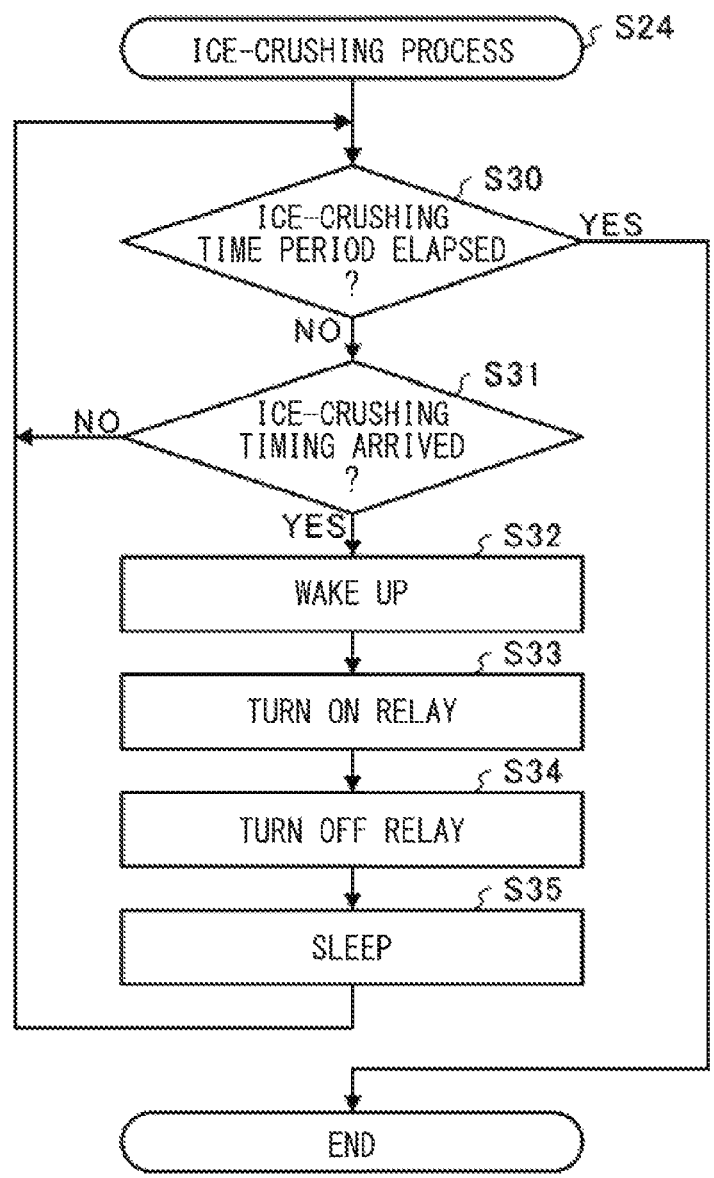
FIG. 6 is a flowchart of an ice-crushing process according to one example embodiment of the disclosure.

FIG. 6 is a flowchart of the ice-crushing process (Step S24) according to the example embodiment. After starting the ice-crushing process, the relay control unit 64 may determine whether the ice-crushing time period has elapsed (Step S30). For example, the relay control unit 64 may include a first timer that measures the ice-crushing time period. The relay control unit 64 may cause the first timer to start the measurement when the ice-crushing process is started. In a case where the time measured by the first timer is longer than or equal to a predetermined time indicating the ice-crushing time period, the relay control unit 64 may determine that the ice-crushing time period has elapsed (Step S30: YES).

If the ice-crushing time period has not elapsed yet (Step S30: NO), the relay control unit 64 may determine whether an ice-crushing timing at which the ice-crushing operation is to be executed has arrived (Step S31). For example, the relay control unit 64 may include a second timer that measures the ice-crushing time interval. The relay control unit 64 may cause the second timer to start the measurement when the ice-crushing process is started. In a case where the time measured by the second timer is longer than or equal to a predetermined time indicating the ice-crushing time interval, the relay control unit 64 may determine that the ice-crushing timing has arrived (Step S31: YES).

If the ice-crushing timing has not arrived yet (Step S31: NO), the relay control unit 64 may cause the process to return to Step S30 and repeat Step S30 and the subsequent steps.

Note that the determination regarding the ice-crushing time period in Step S30 and the determination regarding the ice-crushing timing in Step S31 may be performed while the processor 60 serving as the relay control unit 64 is in the sleep mode. Although operations executable in the sleep mode are limited, necessary processes such as ones at Steps S30 and S31 may be executable in the sleep mode.

If it is determined that the ice-crushing timing has arrived (Step S31: YES), the relay control unit 64 may wake up from the sleep mode and switch to the running mode (Step S32). The limitation on the processor 60 may be thereby cancelled.

After waking up, the relay control unit 64 may turn on the relay 10 (Step S33). For example, the relay control unit 64 may turn on the exciting switch 74 to flow an electric current in the exciting coil 28. The attractive force of the exciting coil 28 may be thereby generated, and the movable contact 24 may be moved closer to the fixed contact 22. The relay 10 may be thereby turned on. In this case, the movable contact 24 may collide against the fixed contact 22. Ice generated on the contacts 21 may be crushed by the impact of the collision between the movable contact 24 and the fixed contact 22.

After turning on the relay 10 in Step S33, the relay control unit 64 may turn off the relay 10 without delay (Step S34). For example, the relay control unit 64 may turn off the exciting switch 74 to shut off an electric current to be supplied to the exciting coil 28. The attractive force of the exciting coil 28 may be thereby eliminated, and the movable contact 24 may be moved away from the fixed contact 22 by the urging force of the urging member 26. The relay 10 may be thereby turned off. The time from Step S33 in which the relay 10 is turned on to Step S34 in which the relay 10 is turned off may be sufficiently shorter than the ice-crushing time interval.

After turning off the relay 10 in Step S34, the relay control unit 64 may switch from the running mode to the sleep mode (Step S35). Thereafter, the relay control unit 64 may cause the process to return to Step S30 and repeat Step S30 and the subsequent steps.

Although not illustrated in FIG. 6, the relay control unit 64 may reset the measurement by the second timer and cause the second timer to start the measurement in Step S34 in which the relay 10 is turned off. In this case, if the determination regarding the ice-crushing timing in Step S31 is performed again after execution of the processes from Step S32 to Step S35, the time from the latest relay-off may be measured. This allows the relay control unit 64 to appropriately control the ice-crushing time interval.

The relay control unit 64 may repeat the processes from Step S30 to Step S35 until the ice-crushing time period elapses. If the ice-crushing time period has elapsed (Step S30: YES), the relay control unit 64 may end the ice-crushing process.

As described above, the control apparatus 12 of the relay 10 according to the example embodiment determines whether the ice generation condition is satisfied on the basis of one or both of the state of the heat source and the outside air temperature after the drive source is stopped operating. If it is determined that the ice generation condition is satisfied, the control apparatus 12 turns on the relay 10 having been turned off and thereafter turns off the relay 10 to thereby intermittently repeat the ice-crushing operation in which the movable contact 24 collides against the fixed contact 22 at the predetermined ice-crushing time interval in the predetermined ice-crushing time period. The ice-crushing time period is a time period that is determined depending on the temperature difference $\Delta T$ between the temperature Tc of the contact 21 of the relay 10 and the temperature Tin of the internal atmosphere inside the relay 10. The ice-crushing time interval is a time period in which the ice on the contacts 21 of the relay 10 grows to a predetermined size. Accordingly, even if ice is generated on the contacts 21 of the relay 10, the control apparatus 12 according to the example embodiment makes it possible to perform the ice-crushing operation to crush and remove the ice on the contacts 21 of the relay 10.

Thus, it is possible for the control apparatus 12 according to the example embodiment described above to appropriately address freezing occurring at the contacts 21 of the relay 10.

In the example embodiment described above, the predetermined size of the ice may be set to a size smaller than or equal to the maximum size that is crushable in the single ice-crushing operation. Thus, the control apparatus 12 according to the example embodiment described above makes it possible to surely crush and remove the ice through the ice-crushing operation.

In the example embodiment described above, the ice-crushing time interval may be four minutes or shorter which corresponds to the time period in which the ice on the contacts 21 of the relay 10 grows to the maximum size that is crushable in the single ice-crushing operation. Further, the ice-crushing time interval may be 30 seconds or longer to reduce electric consumption at the time of turning on and turning off the relay 10. That is, the ice-crushing time interval may be within the range from 30 seconds to 4 minutes both inclusive.

In the example embodiment described above, the predetermined ice-crushing time period may include the time period in which the temperature difference $\Delta T$ between the temperature Tc of the contact 21 and the temperature Tin of the internal atmosphere increases with time. This allows the control apparatus 12 according to the example embodiment described above to perform the ice-crushing operation in a time period in which freezing is easy to occur. Accordingly, it is possible to appropriately crush the ice.

In the example embodiment described above, the predetermined ice-crushing time interval may be set on the basis of the magnitude of the inrush current flowing between the movable contact 24 and the fixed contact 22 when the relay 10 is turned on in the ice-crushing operation. Accordingly, it is possible for the control apparatus 12 according to the example embodiment described above to set the ice-crushing time interval to an appropriate time interval (e.g., a longer time interval) on the basis of the magnitude of the inrush current.

Alternatively, in the example embodiment described above, the predetermined ice-crushing time interval may be set on the basis of the impact force of a collision between the movable contact 24 and the fixed contact 22 caused by turning on the relay 10 in the ice-crushing operation. Accordingly, it is possible for the control apparatus 12 according to the example embodiment described above to set the ice-crushing time interval to an appropriate time interval (e.g., a longer time interval) on the basis of the magnitude of the impact force.

Further, the relay control unit 64 according to the example embodiment described above may turn off the relay 10 and switch to the sleep mode at the start timing of the ice-crushing time period. The relay control unit 64 may wake up from the sleep mode and perform the ice-crushing operation every time the execution timing of the ice-crushing operation arrives at the predetermined ice-crushing time interval. After executing the ice-crushing operation, the relay control unit 64 may switch to the sleep mode. Accordingly, the control apparatus 12 according to the example embodiment described above makes it possible to reduce electric consumption as compared with the case were the running mode is maintained in the ice-crushing time period. Therefore, it is possible for the control apparatus 12 according to the example embodiment to address freezing that occurs at the contact 21 of the relay 10 while reducing electric consumption.

Although some example embodiments of the disclosure have been described in the foregoing by way of example with reference to the accompanying drawings, the disclosure is by no means limited to the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A control apparatus to be mounted on a vehicle, the control apparatus comprising:
   one or more processors configured to control a relay, the relay comprising a fixed contact and a movable contact; and
   one or more memories coupled to the one or more processors, wherein
   the one or more processors are configured to
      determine whether an ice generation condition is satisfied on a basis of at least one or both of a state of a heat source of the vehicle and an outside air temperature after a stop of an operation of a drive source of the vehicle, the ice generation condition being a condition in which ice is expected to be generated on the fixed contact and the movable contact of the relay due to freezing, and
      intermittently repeat, in a case where the ice generation condition is satisfied, an ice-crushing operation at a predetermined time interval in a predetermined ice-crushing time period after a time point when the relay is turned off in accordance with the stop of the operation of the drive source, by turning on the relay having been turned off and thereafter turning off the relay to collide the movable contact against the fixed contact,
   the predetermined ice-crushing time period is determined on a basis of a temperature difference between a temperature of the fixed contact or the movable contact of the relay and a temperature of an internal atmosphere inside the relay, and
   the predetermined time interval is a time period in which the ice on the fixed contact and the movable contact of the relay grows to a predetermined size.

2. The control apparatus according to claim 1, wherein the predetermined size of the ice is set to a size smaller than or equal to a maximum size that is crushable by single ice-crushing operation which consists of turning on the relay having been turned off and thereafter turning off the relay to collide the movable contact against the fixed contact.

3. The control apparatus according to claim 2, wherein the predetermined ice-crushing time period includes a time period in which the temperature difference increases with time.

4. The control apparatus according to claim 3, wherein the predetermined time interval is determined on a basis of a magnitude of an inrush current flowing between the movable contact and the fixed contact when the relay is turned on in the ice-crushing operation.

5. The control apparatus according to claim 3, wherein the predetermined time interval is determined on a basis of an impact force of a collision between the movable contact and the fixed contact caused by turning on the relay in the ice-crushing operation.

6. The control apparatus according to claim 3, wherein
   the one or more processors are further each configured to
      turn off the relay and switch from a running mode to a sleep mode at a start timing of the ice-crushing time period,
      switch from the sleep mode to the running mode, and perform the ice-crushing operation every time when an execution timing of the ice-crushing operation arrives at the predetermined time interval, and
      switch from the running mode to the sleep mode after performing the ice-crushing operation.

7. The control apparatus according to claim 2, wherein the predetermined time interval is determined on a basis of a magnitude of an inrush current flowing between the movable contact and the fixed contact when the relay is turned on in the ice-crushing operation.

8. The control apparatus according to claim 2, wherein the predetermined time interval is determined on a basis of an impact force of a collision between the movable contact and the fixed contact caused by turning on the relay in the ice-crushing operation.

9. The control apparatus according to claim 2, wherein
   the one or more processors are further configured to
      turn off the relay and switch from a running mode to a sleep mode at a start timing of the ice-crushing time period,
      switch from the sleep mode to the running mode, and perform the ice-crushing operation every time when an execution timing of the ice-crushing operation arrives at the predetermined time interval, and
      switch from the running mode to the sleep mode after performing the ice-crushing operation.

10. The control apparatus according to claim 1, wherein the predetermined ice-crushing time period includes a time period in which the temperature difference increases with time.

11. The control apparatus according to claim 10, wherein the predetermined time interval is determined on a basis of a magnitude of an inrush current flowing between the movable contact and the fixed contact when the relay is turned on in the ice-crushing operation.

12. The control apparatus according to claim 10, wherein the predetermined time interval is determined on a basis of an impact force of a collision between the movable contact and the fixed contact caused by turning on the relay in the ice-crushing operation.

13. The control apparatus according to claim 10, wherein
   the one or more processors are further each configured to
      turn off the relay and switch from a running mode to a sleep mode at a start timing of the ice-crushing time period,
      switch from the sleep mode to the running mode, and perform the ice-crushing operation every time when an execution timing of the ice-crushing operation arrives at the predetermined time interval, and
      switch from the running mode to the sleep mode after performing the ice-crushing operation.

14. The control apparatus according to claim 1, wherein the predetermined time interval is determined on a basis of a magnitude of an inrush current flowing between the movable contact and the fixed contact when the relay is turned on in the ice-crushing operation.

15. The control apparatus according to claim 1, wherein the predetermined time interval is determined on a basis of an impact force of a collision between the movable contact and the fixed contact caused by turning on the relay in the ice-crushing operation.

16. The control apparatus according to claim 1, wherein
   the one or more processors are further configured to
      turn off the relay and switch from a running mode to a sleep mode at a start timing of the ice-crushing time period,
      switch from the sleep mode to the running mode, and perform the ice-crushing operation every time when an execution timing of the ice-crushing operation arrives at the predetermined time interval, and
switch from the running mode to the sleep mode after performing the ice-crushing operation.

\* \* \* \* \*